(12) United States Patent
Okamoto

(10) Patent No.: US 7,881,600 B2
(45) Date of Patent: Feb. 1, 2011

(54) PHOTOGRAPHING DEVICE

(75) Inventor: Teppei Okamoto, Saitama (JP)

(73) Assignee: Hoya Corporation, Tokyo (JP)

( * ) Notice: Subject to any disclaimer, the term of this patent is extended or adjusted under 35 U.S.C. 154(b) by 255 days.

(21) Appl. No.: 11/673,763

(22) Filed: Feb. 12, 2007

(65) Prior Publication Data

US 2007/0188644 A1  Aug. 16, 2007

(30) Foreign Application Priority Data

Feb. 15, 2006  (JP) .............................. 2006-037703

(51) Int. Cl.
G03B 3/10 (2006.01)
G03B 17/18 (2006.01)

(52) U.S. Cl. ...................... 396/121; 396/147
(58) Field of Classification Search ................ 396/121, 396/123, 147
See application file for complete search history.

(56) References Cited

U.S. PATENT DOCUMENTS

| 7,155,058 | B2 * | 12/2006 | Gaubatz et al. ............. 382/167 |
| 7,423,669 | B2 * | 9/2008 | Oya et al. .............. 348/208.14 |
| 2004/0086157 | A1 * | 5/2004 | Sukegawa ................... 382/115 |
| 2004/0218827 | A1 * | 11/2004 | Cohen et al. ............... 382/243 |
| 2005/0007486 | A1 | 1/2005 | Fujii et al. |
| 2005/0265581 | A1 * | 12/2005 | Porter et al. ............... 382/103 |
| 2006/0012702 | A1 * | 1/2006 | Kawahara et al. ........... 348/345 |
| 2006/0034602 | A1 * | 2/2006 | Fukui ......................... 396/263 |
| 2006/0044444 | A1 | 3/2006 | Okamoto et al. |
| 2006/0088210 | A1 * | 4/2006 | Yu et al. ..................... 382/167 |
| 2007/0188644 | A1 * | 8/2007 | Okamoto ............... 348/333.01 |

FOREIGN PATENT DOCUMENTS

| JP | 8-63597 | 3/1996 |
| JP | 9-135380 | 5/1997 |
| JP | 2005-31200 | 2/2005 |
| JP | 2006-33440 | 2/2006 |

OTHER PUBLICATIONS

English language Abstract of JP 8-63597.
JAPAN Office action, dated Sep. 2010 along with an English translation thereof.

* cited by examiner

*Primary Examiner*—Clayton E Laballe
*Assistant Examiner*—Dennis Hancock
(74) *Attorney, Agent, or Firm*—Greenblum & Bernstein P.L.C.

(57) ABSTRACT

A photographing device for photographing an object in a photographing area has a detection processor, and first and second determination processors. The detection processor conducts repetitive detection processes for detecting a specific area where a specific object appears in the photographing area. The first determination processor determines the detected specific area to be a designated area. The second determination processor re-determines a substitute area including the detected specific area that has been latest detected by the detection processor to be the designated area if the specific area is not detected in the detection process.

18 Claims, 3 Drawing Sheets

PHOTOGRAPHING DEVICE

BACKGROUND OF THE INVENTION

1. Field of the Invention

The present invention relates to a photographing device, for example a digital camera, that can detect a specific object, for example a human face, in a photographing area.

2. Description of the Related Art

Conventionally, it is known that a face-recognizing device can automatically detect a human face in a photographing area, as shown in Japanese Unexamined Patent Publication (KOKAI) NO.8-63597. Due to this device, by using the information of the detected face area it is easy to focus on the human face and adjust an exposure of the human face to the proper value, which makes the human face reproduce clearly and naturally on the photographing image in the digital camera.

Usually, the detection process for detecting a human face is conducted in the stand-by mode where the through image displays on the monitor, and the detected face area is bordered by a frame on the through image so as to designate the face area. Because the person object sometimes moves, the detection process is usually repeated for detecting the moving face area correctly, and then the frame usually moves to follow the moving human face.

However, due to the size or the orientation of the human face, the human face is not always detected in the detection process, even when the human face actually appears on the photographing area. Therefore, the face area is intermittently detected and not detected. When the face area is not detected, the frame does not display on the monitor; causing the frame to fluctuate with and without a display on the monitor. This fluctuating display makes a user feel uncomfortable and confused about the shutter release timing.

Furthermore, if the shutter is released at the moment that the human area is not detected, the focus- and exposure-adjustment is conducted without the information of the position of the face area. Therefore, the human face is sometimes reproduced unclearly or unnaturally on the photographing image, even in portrait mode.

SUMMARY OF THE INVENTION

Therefore, an object of the present invention is to provide a photographing device which can reliably reproduce the human face on the photographing image and make the user feel comfortable by improving the display system of the monitor.

According to the present invention, there is provided a photographing device for photographing an object in a photographing area. The photographing device has a detection processor, and first and second determination processors. The detection processor conducts repetitive detection processes for detecting a specific area where a specific object appears in the photographing area. The first determination processor determines the detected specific area to be a designated area. The second determination processor re-determines a substitute area including the detected specific area that has been latest detected by the detection processor to be the designated area if the specific area is not detected in each successive detection process.

According to the present invention, there is provided a method of determining a designated area for photographing an object in a photographing area. The method has a repeating step of detection processes for detecting a specific area where a specific object appears in the photographing area. Further, the method has a step for determining the detected specific area to be a designated area, and re-determining a substitute area including the specific area that has been latest detected in the detection processes as the designated area if the specific area is not detected in each successive detection process.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
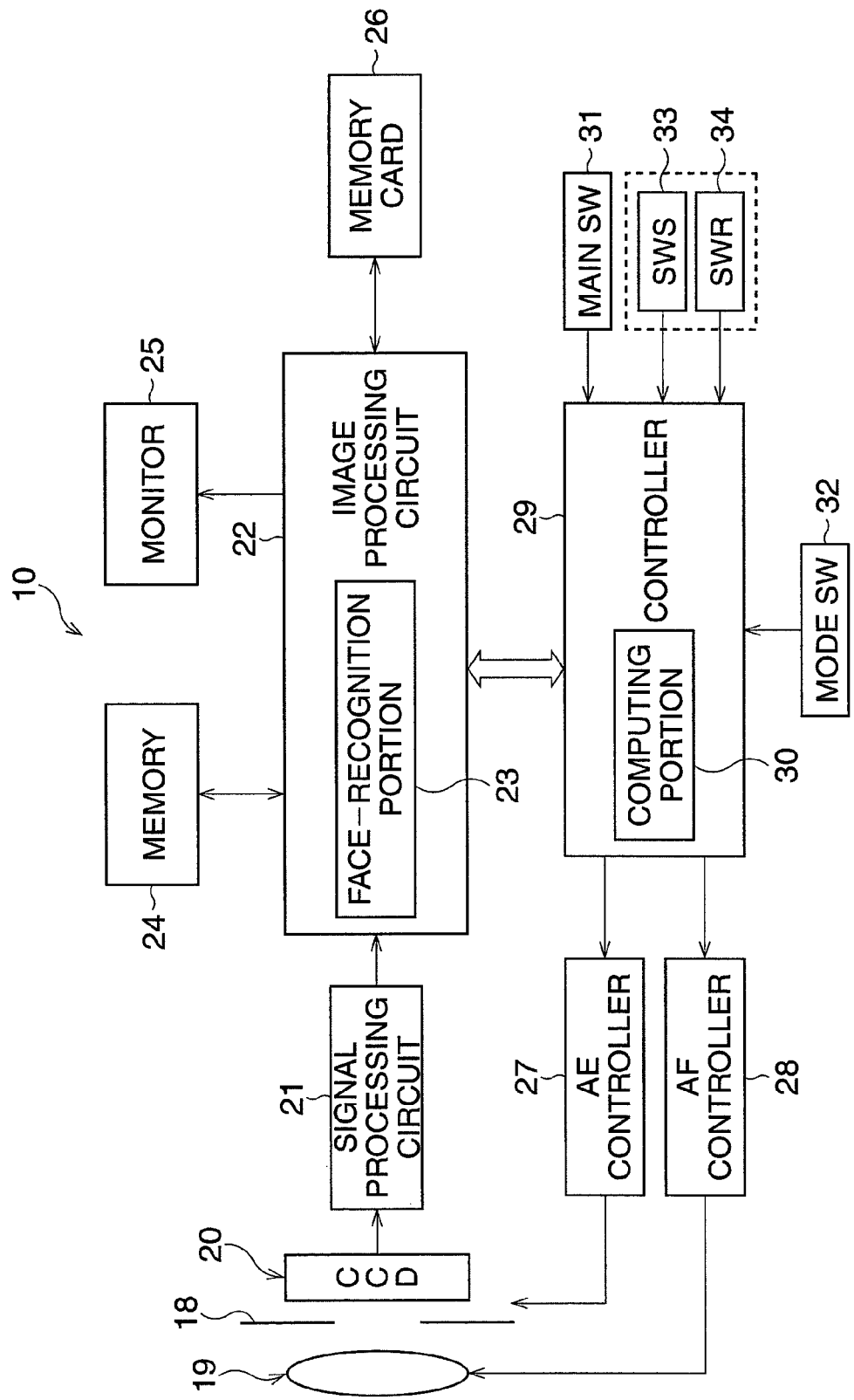
FIG. 1 is a block diagram of a digital camera in an embodiment according to the present invention.

The present invention will be described below with reference to the embodiments shown in the drawings.

FIG. 1 shows a block diagram of a digital camera in an embodiment according to the present invention. A digital camera 10 has a controller 29 including a computing portion 30. The workings of the digital camera 10 start by switching a main switch 31 on, and are controlled by the controller 29. An operating mode of the digital camera 10 is set and changed by a mode switch 32, and the manner in which the digital camera 10 works depends on the operating mode. The operation in the case where the mode is set to a portrait mode will be explained below.

The digital camera 10 has an optical photographing system 19 and an imaging device 20 such as a CCD. The optical photographing system 19 focuses an optical image of an object in the photographing area of the system 19 on a light receiving surface of the imaging device 20. A diaphragm 18, which is disposed between the optical photographing system 19 and the imaging device 20, adjusts the exposure of the imaging device 20.

The digital camera 10 remains in a stand-by mode until a release button (not shown in Figs.) is depressed. In stand-by mode, the imaging device 10 photographs the object in the photographing area as a through image, as described below.

The imaging device 10 captures the optical image which is formed thereon, and generates an analog image signal corresponding to the optical image. The analog image signal is converted to a digital image signal with noise eliminated from the image signal by a signal processing circuit 21. The digital image signal is input to an image processing circuit 22, which is provided in the digital camera 10. The digital signal undergoes various image processes at the image processing circuit 22 before being stored in a memory 24 as the image data. The number of image pixels of the image data is reduced before the image data displays on a monitor 25 as the through image.

The image processing circuit 22 has a face-recognition portion 23 which stores a template of an average human face. The face-recognition portion 23 conducts a detection process for detecting a face area (specific area) where a human face (specific object) appears in the image data (namely, in the photographing area) using the template and the image data stored in the memory 24.

Figure 2:
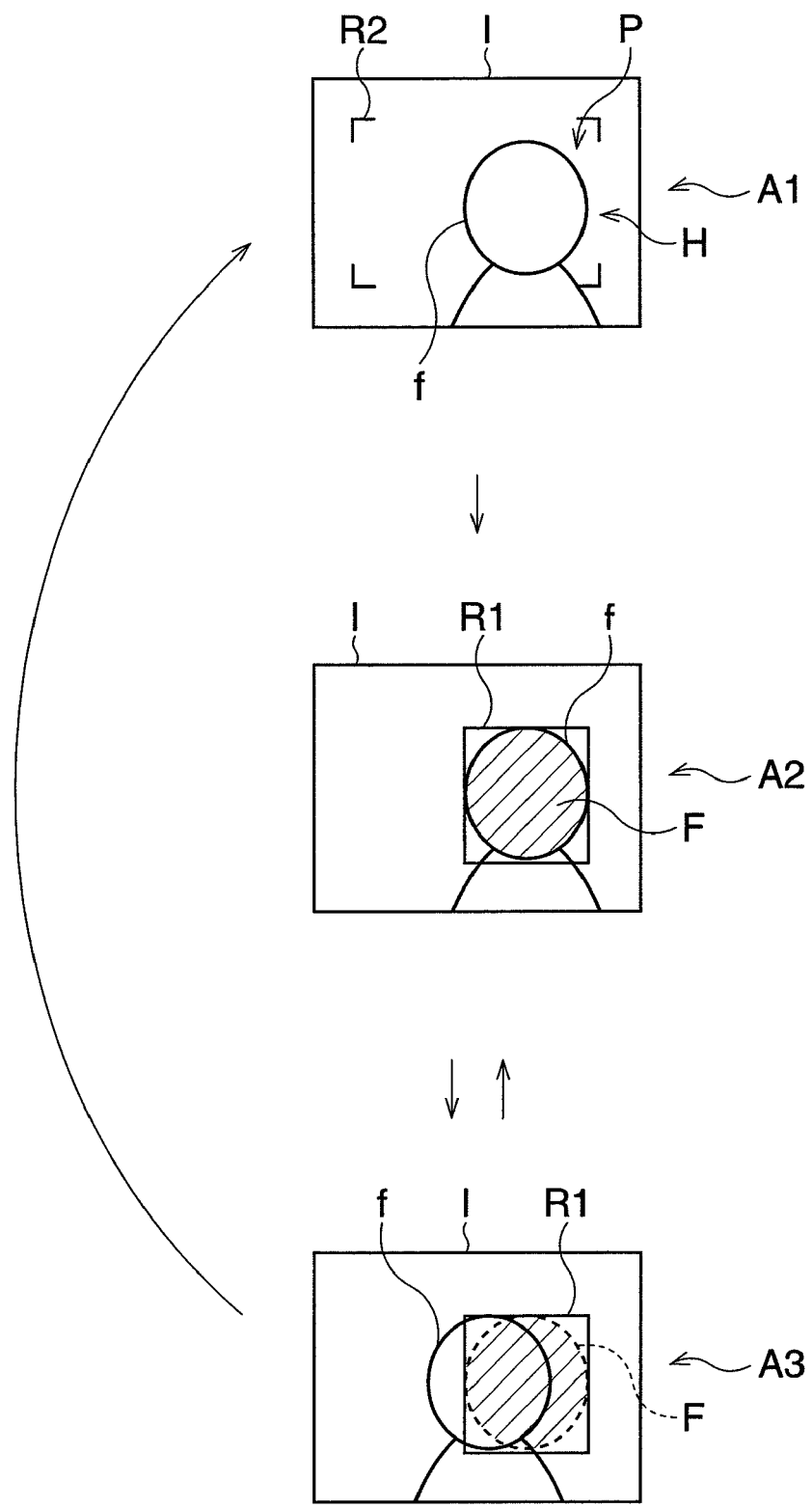
FIG. 2 schematically shows on a monitor of the digital camera in portrait mode.

If the face area is detected, the detected face area F (as shown in FIG. 2) is determined to be a designated area, and area information regarding the detected face area F is written to the memory 24. Further, when previous area information has been stored in the memory 24, the new area information is written over the previous area information and the previous area information is deleted.

In stand-by mode, the image data is successively generated, and successively displayed on the monitor 25 as the through image, so that the detection process regarding the image data of each optical image is repeated. While the detection process is being repeated, if the face area is not detected in the detection process, the area information regarding the new detected area is not generated and the memory 24 continues to store the area information regarding the detected face area F which was the latest detected by the face-recognition portion 23. Then, the detected face area F that was the latest detected by the face-recognition portion 23 is re-determined to be the designated area, based on the stored data information. Further, the face-recognition portion 23 has a timer which can measure elapsed time.

In the image processing circuit 22, a first frame R1 (as shown in FIG. 2) for indicating the position of the designated area in the through image is generated based on the area information stored in the memory 24. A second frame R2 (as shown in FIG. 2) as described below, is also generated by the circuit 22. The first or second frame R1 or R2 is displayed on the monitor.

In stand-by mode, when the release button is half-depressed, a SWS switch 33 is switched on, the optical photographing system 19 is repositioned by an AF controller 28 to focus on the object in the photographing area, and the diaphragm 18 is adjusted by an AE controller 29 to adjust the exposure of the imaging device 20.

When the release button is fully-depressed, a SWR switch 34 is switched on. According to this switching on, the image data corresponding to the optical image captured by the image device 20 is generated as a still image similar to the through image, and is recorded in a memory card (recording media) 26 as a recorded still image without reducing the number of image pixels of the image data.

FIG. 2 schematically shows the images in the monitor in the $1^{st}$-$3^{rd}$ states A1-A3 of the monitor. The monitor is in the first state A1 when the detected face area is not determined to be the designated area. The monitor is in the second state A2 when the face area is detected and the detected face area F is determined to be the designated area. The monitor is in the third state A3 when the face area is not detected and the previously detected face area F is re-determined to be the designated area.

When the portrait mode starts, the through image I starts to display on the monitor. In the example as shown in FIG. 2, there is a person object H in the photographing area so that the human face f appears in the through image I.

When the through image I starts to display, the detection process for detecting the human face f in the photographing area is conducted using the image data of the through image I. In the detection process, first, data of a flesh-colored area is picked up from the image data. Next, the flesh-colored area in the image data is compared with the template of an average human face stored in the face recognition portion 23 of the image processing circuit 22, and the flesh-colored area closest in similarity to the template becomes the detected face area F (the area marked with diagonal lines in FIG. 2) if the measurement quantifying level of "closeness" exceeds a predetermined minimum threshold level.

The detected face area F is determined to be the designated area, and then the first frame R1 that borders the designated area and overlaps the through image I displays on the monitor 25 so as to indicate the position of the designated area. Namely, the monitor assumes the second state A2. The first frame R1 is substantially square or rectangular, but is not limited to these shapes. Further, the size of the first frame R1 is modified according to the size of the designated area.

On the other hand, in the detection process, if it is determined that there is no human face f in the photographing area that is similar enough to the template so as to exceed the predetermined minimum threshold level of "closeness" described above, then the monitor assumes the first state A1, and the second frame R2 bordering a predetermined area P that overlaps the through image I displays on the monitor so as to indicate the predetermined area P. Further, the predetermined area P is rectangular and is located on the center of the through image I, occupying almost all of the area thereof.

The method for detecting the face area is disclosed in Japanese Unexamined Patent Publication NO.8-63597, for example, but the method utilized herein is not limited to the specific method known in the prior art referred to above; any number of appropriate face area detection methods can be applied to this embodiment.

As the detection process described above is repeated, if the human face f continues to be detected in the successive detection processes, the new detected face area F continues to be determined as the designated area, instead of the previously designated area. In this case, the first frame R1 continues to display on the monitor so as to outline the detected face area F. Therefore, in the second state A2, the first frame R1 moves to follow the moving human face f if the human face f moves.

While the detection process is repeated, the human face f sometimes goes undetected. However, in portrait mode, the person object H usually moves very little, so the human face f usually appears continuously in the same area. Accordingly, even if the human face f is not detected, it is highly possible that the human face f appears in or near the detected face area F from the previous detection process.

Therefore, in this embodiment, once the detected face area F has been established from the detection process, if the human face f is not detected, the face area F that had most recently been detected by the face-recognition portion 23 is re-determined to be the designated area. Namely, the latest detected face area F is re-determined to be the designated area, and the monitor assumes the third state A3. Due to this, the first frame R1 continuously displays the same position bordering surround the latest detected area F on the monitor. Further, the position indicated by the first frame R1 is sometimes different from the position of the actual human face f when the monitor is in the third state A3, as shown in FIG. 2, because the human face f sometimes moves.

At times, the face area will continuously go undetected for long periods during which the detection process is repeated, following the latest detection of the detected face area F. In this case, it is highly possible that the human face f does not appear on the through image I, or that the position of the actual human face f is significantly different from the position indicated by the first frame R1 even when the human face f does appear. Therefore, if the human face f is not detected continuously for a predetermined period, such as for 1-6 seconds after the latest detection of the human face f (namely, if the monitor remains in the third state A3 for the predetermined period), the detected face area F stops being re-determined as the designated area. In this situation, the first frame R1 stops displaying on the monitor, and the monitor assumes the first state A1; namely, it displays the second frame R2 instead of the first frame R1.

Further, the detected face area F is determined to be the designated area and the monitor assumes the second state A2 when the human face f is detected in the detection process in state A1 or state A3, of course.

When the detected area F is determined or re-determined to be the designated area (namely, in the second A2 or third state A3), if the SWS switch is switched on, automatic focus and exposure adjustments are conducted using the area information of the designated area. Namely, the position of the optical photographing system 19 is adjusted so that the system 19 focuses on the object appearing in the designated area of the photographing area, and the diaphragm 18 is moved so as to adjust the exposure value of the imaging device 20 according to the photometering value of the designated area. If the SWR switch 34 is switched on, the object is photographed and the still image is generated in the state where the diaphragm 18 and the system 19 are adjusted as described above.

As described above, the detected area F has been determined or re-determined as the designated area for a short period of time since the detection of the face area F. Therefore, it is highly likely that the human face f appears in the designated area so that the system 19 focuses on the human face f and the exposure value of the human face area is adjusted appropriately. Under these conditions, the human face f is well-reproduced in the photographed still image.

On the other hand, when the detected face area F is not determined or re-determined as the designated area (namely, the monitor is in the first state A1), if the SWS switch 33 is switched on, automatic focus and exposure adjustments are conducted, similar to the ordinary photographing conditions. Therefore, the position of the system 19 is adjusted so that it focuses on the object nearest to the camera at one point in a plurality of predetermined points in the predetermined area P, and the diaphragm 18 is moved so as to adjust the exposure value of the imaging device 20 according to the photometering values of predetermined points in the predetermined area P. In this case, if the SWR switch 34 is switched on, the still image is obtained in conditions where the system 19 and diaphragm 18 are adjusted as described above.

Figure 3:
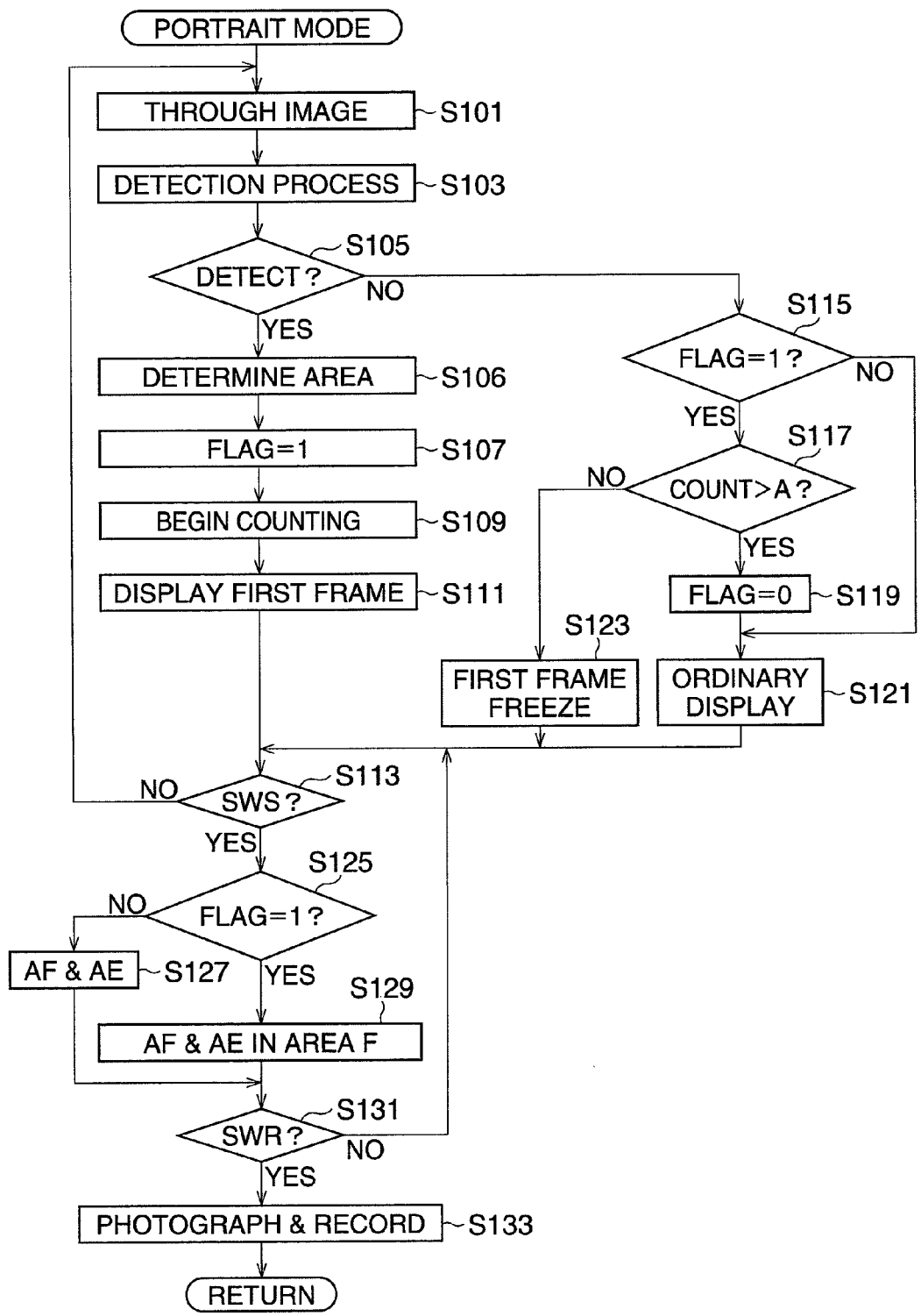
FIG. 3 is a flowchart showing the routine in portrait mode.

FIG. 3 is a flowchart showing the routine in portrait mode in this embodiment. As shown in FIG. 3, when portrait mode commences, the digital camera 10 enters stand-by mode and the image data corresponding to the optical image captured by the imaging device 20 is generated, and displayed on the monitor 25 as the through image at step S101.

At step S103, the process for detecting a face area where a human face appears in the image data generated at step S101 is performed. At step S105, a determination is made as to whether or not the face area is detected in the detection process at step S103.

If the face area is detected, the detected face area F is determined to be the designated area at step S106. At step S107, the area information of the designated area is stored in the memory 24, and a flag in the face-recognition portion 23 is set to "1", indicating that the detected face area F has been designated. At step S109, the timer in the face-recognition portion 23 begins counting time. At step S111, the first frame R1, which borders the designated area, generates and displays on the monitor, which is in the second state A2, as shown in FIG. 2. After step S111, it is determined whether the SWS switch is switched on or off at step S113. If the SWS switch is switched off the routine goes back to step S101.

At this point, if it is determined that the face area was not detected at step S105, the routine goes to step S115, where it is determined whether the flag is set to "1" or not. At step S117, it is determined whether the elapsed time measured by the timer has exceeded the predetermined period. If the flag is set to "1" and the elapsed time has not exceeded the predetermined period, the routine proceeds to step S123. At step S123, the detected face area F that is latest detected at step S103 is re-determined to be the designated area, and the latest first frame R1 generated at step S111 continues to display on the monitor. Namely, the first frame R1 freezes to display in the same position and the monitor is in the third state A3.

If the time measured by the timer has exceeded the predetermined period while the flag is set to "1", the flag is changed from "1" to "0" at step S119, and the monitor discontinues displaying the first frame R1 and begins displaying the second frame R2 at step S121. Thus, the monitor is in the first state A1 at step S121, because an extended amount of time has passed since the face area was last detected.

On the other hand, if it is determined that the flag is set to "0" at step S115, the first frame R1 does not display on the monitor because the face area is not determined to be the designated area. Therefore, the second frame R2 starts or continues to display on the monitor at step S121, and the monitor is in the first state A1. After step S121, and 123, it is determined whether the SWS switch is switched on or off at step S113. If the SWS switch is switched off the routine goes back to step S101, and then the routine of steps S101-S123 is repeated.

It is determined whether the SWS switch is switched on at step S113, the routine goes to step S125. At step S125, it is determined whether the flag is set to "1". If the flag is set to "1", the system 19 is focused on the object appearing in the designated area of the photographing area and the exposure of the imaging device is adjusted using the image data of the designated area at step S129, because the detected face area F was determined to be the designated area.

On the other hand, if the flag is set to "0", the system 19 is focused on the object appearing in the predetermined area P and the exposure of the imaging device is adjusted using the image data of the predetermined area P at step S127, because the detected face area F was not determined to be the designated area.

After that, at step S131, it is determined whether the SWR switch 34 is switched on or off. If the SWR switch 34 is switched on, the photographing image is obtained in the state where the focus and exposure have been adjusted at step S127 or S129, and it is recorded as the still image at step S133. Further, if the SWR switch is switched off, the routine goes back to step S113.

As described above, if the human face is not detected in the detection process, the latest detected area F is re-determined to be the designated area, and the first frame R1 continues to display on the monitor, regardless of whether or not the human face is detected. Accordingly, display and no-display of the first frame R1 does not repeat, resulting in a continuous display image that enables the user to ascertain the appropriate shutter timing. In addition, when the human face is not detected immediately before the still image is obtained, the optical system is focused on the object in the latest detected face area and the exposure adjustment are made according to the image data of the latest detected face area. Accordingly, making it easier to photograph a person appropriately in portrait mode.

Further, as described above, the same area as the latest detected area F at step S103 is re-determined to be the designated area at step S123. However, the designated area re-determined at step S123 can be an area (substitute area) that includes the area F latest detected at step S103 but is larger than the latest detected area. In this case, the first frame R1 displayed on the monitor borders the larger designated area F at step S123. The position of the designated area is often different from that of the actual human face because a small amount of time passes between the detection of the human face f and re-determination of the designated area at step S123. Despite the difference in position, it is easy to arrange the actual face area f in the designated area F because of the enlarged designated area.

Further, the predetermined area P can be a part of the photographing area which includes the latest detected area and which is larger than the latest detected area. Furthermore, at step S131, if the SWR switch is not switched on, the routine may go back to step S101, instead of going back to step S113.

In this embodiment, the detection process is conducted regarding each frame of the through image, but the detection process does not necessarily have to be conducted with regard to each frame. For example, the detection process may be conducted regarding every other frame of the through image.

In this embodiment, the human face is detected as the specific object, but another object can also be detected as the specific object. Further, in this embodiment, the digital camera is used as the photographing device, but another photographing device such as a video camera or a film camera can be used as the photographing device.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-037703 filed on Feb. 15, 2006) which is expressly incorporated herein, by reference, in its entirety.

The invention claimed is:

1. A photographing device for photographing an object in a photographing area, comprising:
    an imaging device that successively captures images corresponding to said object;
    a display device;
    a first display processor that displays said successively captured images on said display device as a through image;
    a detection processor that repetitively conducts a detection process that detects a specific area, of the photographing area, within which a specific object is present;
    a first determination processor that determines the detected specific area to be a designated area;
    a second display processor that indicates a position of said designated area, in the through image; and
    a second determination processor that sets a substitute area as the detected specific area that has been last detected by said detection processor to be said designated area if said specific area is not detected in a repetition of the detection process, without an intervening different detection process;
    said second display processor continues to indicate the last detected specific area, which is said substitute area, in the through image when the specific area is not detected during a repetition of the detection process.

2. A device according to claim 1, wherein said second display processor displays a frame bordering said designated area on said display device so as to indicate said position.

3. A device according to claim 1, wherein said second determination processor stops setting the substitute area when said specific area is not detected for a predetermined period while said detection processor repeats said detection process.

4. A device according to claim 1, comprising:
    an imaging device that captures an image corresponding to said object as a still image when an object in said designated area is in focus, or when an exposure value of said imaging device is adjusted according to a photometering value of said designated area.

5. A device according to claim 1:
    wherein said imaging device captures an image corresponding to said object as a still image when an object at one of a plurality of points in said photographing area is in focus, or when an exposure value of said imaging device is adjusted according to photometering values of said plurality of points, when said detected specific area or said substitute area are not determined or set to be said designated area.

6. A device according to claim 5, wherein said plurality of points are positioned in a part of said photographing area which includes said detected specific area that has been last detected by said detection processor and which is larger than said designated area.

7. A device according to claim 1, wherein said specific object is a human face.

8. The photographing device according to claim 1, wherein said detection processor detects the specific area based on a template of the specific object.

9. The photographing device according to claim 1, wherein in a repetition of the detection process, when said specific area is not detected, display of an indicating symbol that indicates said position is maintained.

10. The photographing device according to claim 1, said second determination processor sets the substitute area without regard to an actuation of a release button.

11. A method of determining a designated area for photographing an object in a photographing area, the method comprising:
    capturing successive images corresponding to the object;
    displaying the successive captured images on a display device as a through image;
    repeating a detection process for detecting a specific area, of the photographing area, at which a specific object is present,
    determining the detected specific area to be a designated area,
    indicating, in the through image, a position of the designated area,
    setting a substitute area as the specific area that was last detected in the detection process to be the designated area if the specific area is not detected in a repetition of the detection process, without an intervening different detection process; and
    continuing to indicate the last detected specific area, which is said substitute area, in the through image when the specific area is not detected during a repetition of the detection process.

12. The method according to claim 11, wherein the indicating displays, on the display device, a frame bordering the designated area so as to indicate the position.

13. The method according to claim 11, further comprising stopping the setting when the specific area is not detected for a predetermined period while the detection process is repeated.

14. The method according to claim 11, further comprising capturing an image corresponding to the object as a still image when an object in the detected area is in focus.

15. The method according to claim 11, further comprising capturing, by an imaging device, an image corresponding to the object as a still image when an exposure value of the imaging device is adjusted according to a photometering value of the designated area.

16. The method according to claim 11, wherein the specific object is a human face.

17. The method according to claim 11, wherein the capturing, comprises capturing an image corresponding to the object as a still image when an object at one of a plurality of points in the photographing area is in focus, or when an exposure value of the imaging device is adjusted according to a photometering value of the plurality of points, when the detected specific area or the substitute area are not determined or set to be the designated area.

18. The method according to claim 11, wherein the setting of a substitute area is perfoiined without regard to an actuation of a release button.

* * * * *